(12) United States Patent
Weldon

(10) Patent No.: US 6,651,953 B2
(45) Date of Patent: Nov. 25, 2003

(54) FUEL TANK PRESSURE CONTROL VALVE INCLUDING AN IN-LINE FLOW-THROUGH CONSTRUCTION

(75) Inventor: Craig Weldon, Chatham (CA)

(73) Assignee: Siemens Automotive Inc., Ontario (CA)

(*) Notice: Subject to any disclaimer, the term of this patent is extended or adjusted under 35 U.S.C. 154(b) by 0 days.

(21) Appl. No.: 09/923,788

(22) Filed: Aug. 8, 2001

(65) Prior Publication Data
US 2002/0088958 A1 Jul. 11, 2002

Related U.S. Application Data

(60) Provisional application No. 60/223,760, filed on Aug. 8, 2000, provisional application No. 60/232,348, filed on Sep. 14, 2000, provisional application No. 60/232,346, filed on Sep. 14, 2000, and provisional application No. 60/237,879, filed on Oct. 4, 2000.

(51) Int. Cl.$^7$ .............................................. F16K 31/02
(52) U.S. Cl. ............................ 251/129.02; 251/129.21; 123/516; 137/601.14
(58) Field of Search ....................... 251/129.21, 129.02, 251/129.15; 137/604.12, 601.14, 630.19; 123/516, 518, 519, 520

(56) References Cited

U.S. PATENT DOCUMENTS

| 4,252,094 | A | * | 2/1981 | Draxler | 251/129.14 |
|---|---|---|---|---|---|
| 4,326,696 | A | * | 4/1982 | Ishikawa et al. | 251/129.21 |
| 4,483,369 | A | | 11/1984 | Akagi et al. | 137/625.12 |
| 4,582,088 | A | * | 4/1986 | Cook et al. | 251/129.15 |
| 4,763,635 | A | * | 8/1988 | Ballhause et al. | 123/520 |
| 4,790,351 | A | * | 12/1988 | Kervagoret | 251/129.21 |
| 4,919,497 | A | * | 4/1990 | Kaes | 251/129.21 |
| 5,184,593 | A | * | 2/1993 | Kobayashi | 251/129.11 |
| 5,390,703 | A | | 2/1995 | Tengesdal | 137/629 |
| 5,533,707 | A | * | 7/1996 | Beesley | 251/129.21 |
| 5,579,741 | A | * | 12/1996 | Cook et al. | 123/516 |
| 5,629,660 | A | | 5/1997 | Kenyon et al. | 335/227 |
| 5,803,056 | A | * | 9/1998 | Cook et al. | 123/520 |
| 6,021,997 | A | | 2/2000 | Hell | 251/30.04 |
| 6,347,616 | B1 | * | 2/2002 | Rodriguez et al. | 123/520 |

OTHER PUBLICATIONS

U.S. patent application No. 09/960,732, Weldon et al., filed Sep. 24, 2001.

U.S. patent application No. 09/960,718, Weldon et al., filed Sep. 24, 2001.

U.S. patent application No. 09/931,373, Weldon et al., filed Aug. 17, 2001.

U.S. patent application No. 09/923,796, Weldon et al., filed Aug. 8, 2001.

U.S. patent application No. 09/923,792, Weldon et al., filed Aug. 8, 2001.

(List continued on next page.)

Primary Examiner—Gene Mancene
Assistant Examiner—John Bastianelli

(57) ABSTRACT

A valve structure that includes a housing, a valve, and an actuator. The housing includes a first portion, a second portion, and an intermediate portion. The first portion extends along a first axis from a first port, the second portion extends along a second axis from a second port, and the intermediate portion connects the first and second portions. The first and second portions partially define a fluid communication path between the first and second configurations. The valve is movable with respect to the housing between first and second configurations. The first configuration permits substantially unrestricted fluid flow between the first and second ports. The second configuration substantially prevents fluid flow between the first and second ports. The actuator displaces the valve from the first configuration to the second configuration. The actuator partially defines the fluid communication path between the first and second ports.

22 Claims, 3 Drawing Sheets

OTHER PUBLICATIONS

U.S. patent application No. 09/923,790, Weldon et al., filed Aug. 8, 2001.
U.S. patent application No. 09/923,789, Weldon et al., filed Aug. 8, 2001.
U.S. patent application No. 09/863,756, Weldon et al., filed May 24, 2001.
PCT International Search Report; PCT/CA01/00771; Dec. 17, 2001.

* cited by examiner

FUEL TANK PRESSURE CONTROL VALVE INCLUDING AN IN-LINE FLOW-THROUGH CONSTRUCTION

CLAIM FOR PRIORITY

This application claims the benefit of the earlier filing dates of U.S. Provisional Applications Ser. Nos. 60/223,760 (filed Aug. 8, 2000), 60/232,348 (filed Sep. 14, 2000), 60/232,346 (filed Sep. 14, 2000), and 60/237,879 (filed Oct. 4, 2000), which are hereby incorporated by reference in their entirety. This application also claims the benefit of U.S. patent application Ser. No. 09/863,756 (filed May 24, 2001).

FIELD OF THE INVENTION

This disclosure generally relates to a pressure control valve. In particular, this disclosure is directed to an electrically operated valve, including an in-line flow-through construction, to control the level of vapor pressure in a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling on-board refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislated standard.

It is believed that there is needed to provide a valve that overcomes the drawbacks of orifice structures and diaphragm-actuated pressure relief valves.

SUMMARY OF THE INVENTION

The present invention provides a valve structure that comprises a housing, a valve, and an actuator. The housing includes a first portion, a second portion, and an intermediate portion. The first portion extends along a first axis from a first port, the second portion extends along a second axis from a second port, and the intermediate portion connects the first and second portions. The first and second portions partially define a fluid communication path between the first and second configurations. The valve is movable with respect to the housing between first and second configurations. The first configuration permits substantially unrestricted fluid flow between the first and second ports. The second configuration substantially prevents fluid flow between the first and second ports. The actuator displaces the valve from the first configuration to the second configuration. The actuator partially defines the fluid communication path between the first and second ports.

BRIEF DESCRIPTIONS OF THE DRAWINGS

The accompanying drawings, which are incorporated herein and constitute part of this specification, illustrate an embodiment of the invention, and, together with the general description given above and the detailed description given below, serves to explain the features of the invention.

DETAILED DESCRIPTION OF THE PREFERRED EMBODIMENT

A fuel tank pressure control valve 10 can be located along a vapor line (not shown) connecting a fuel vapor dome, i.e., the gaseous portion within a fuel tank (not shown), and a charcoal canister (not shown). A canister purge control valve (not shown) can be used to purge hydrocarbons that have been collected in the charcoal canister (not shown). Typically, the hydrocarbons that are purged from the charcoal canister are combusted by an internal combustion engine (not shown).

A vapor dome pressure level that is approximately 10" water above atmospheric pressure has been determined to suppress fuel vapor generation in the fuel tank (not shown). A fuel tank pressure sensor (not shown) can be used to detect pressures in excess of this determined level. When excess pressure is detected, the fuel tank pressure control valve 10 is supplied an electrical signal, which results in the fuel tank pressure control valve 10 opening to decrease pressure to or slightly below the determined level.

Figure 1:
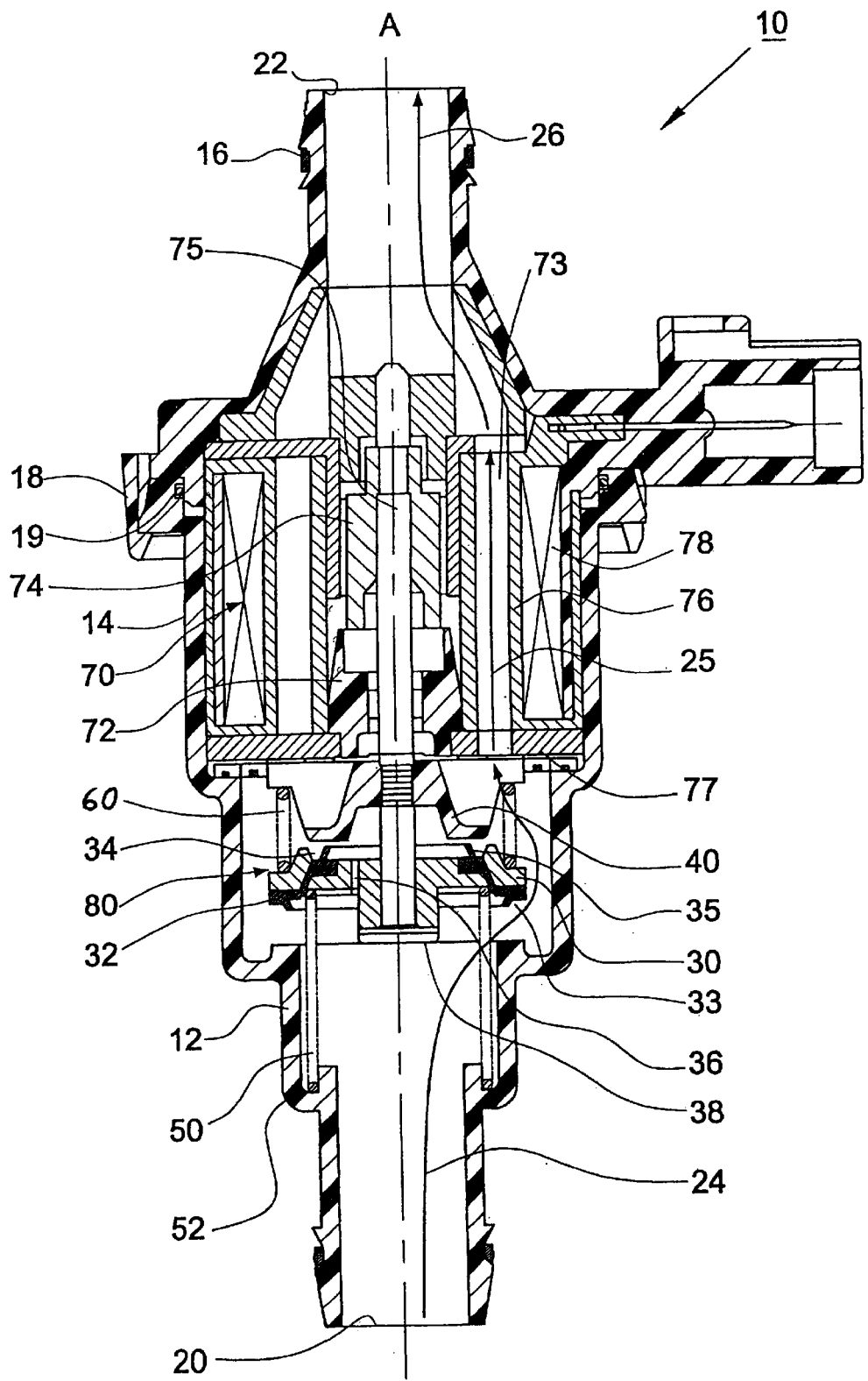
FIG. 1 is a sectional view of a fuel tank pressure control valve in a first configuration wherein fluid flow is permitted through first, second, and third parts of a fluid communication path.

The fuel tank pressure control valve 10 includes a housing, a valve assembly 80, and an actuator 70. The housing can include an inlet housing portion 12, an intermediate housing portion 14, and an outlet housing portion 16. The inlet housing portion 12 extends along an axis A. As shown in FIG. 1 the outlet housing portion 16 also extends along the axis A. However, in another embodiment of the invention (not shown), the outlet housing portion 16 can extend along a second axis (not shown) parallel to the axis A. The intermediate housing portion 14 is disposed between the inlet housing portion 12 and the outlet housing portion 16. The inlet and outlet housing portions 12,16 partially define a fluid communication path between an inlet port 20 and an outlet port 22. The fluid communication path includes an inlet communication path 24, an intermediate communication path 25, and an outlet communication path 26. The inlet housing portion 12 and the outlet housing portion 16 can be made of any material that is suitable for contacting and containing fuel and/or fuel vapor. The intermediate housing portion 14 can be made of any material that is suitable for housing the actuator 70 and for contacting and containing fuel and/or fuel vapor. The inlet and outlet housing portions 12,16 and the intermediate housing portion 14 can be made of different materials or the same material, as long as the material is suitable for its intended purpose. The inlet and intermediate housing portions 12,14 can be a homogenous whole or separate components coupled together, for example, by an interlocking flange assembly. Preferably, the inlet and intermediate housing portions 12,14 are a homogenous whole. The intermediate and outlet housing portions 14,16 can be a homogenous whole or separate components coupled together, for example, by an interlocking flange assembly. Preferably, the intermediate and outlet housing portions 14,16 are separate components coupled together by an interlocking flange assembly 18. Alternative coupling techniques can be substituted for the interlocking flange assembly 18. A rubber O-ring 19 can provide a fluid-tight seal, which is impermeable to hydrocarbon migration, between the intermediate and outlet housing portions 14,16. Alternative sealing means, e.g., a gasket, can be substituted for the O-ring 19. The housing can be two separate halves of the inlet housing portion 12, the intermediate housing portion 14, and the outlet housing portion 16 divided along the axis A. Preferably, the housing is as described above.

The inlet housing portion 12 extends from the inlet port 20 and defines the inlet communication path 24. The inlet port 20 provides a path for ingress of fuel vapor from the fuel tank (not shown). The outlet housing portion 16 includes the outlet port 22 and defines the outlet communication path 26. The outlet port 22 provides a path for egress of fuel vapor to the carbon canister (not shown). Fluid communication between the inlet port 20 and the outlet port 22 can be through the inlet fluid communication path 24, the intermediate fluid communication path 25, and the outlet fluid communication path 26. Fluid flow through the inlet communication path 24 and the outlet communication path 26 is controlled by the valve assembly 80. As used herein, the term "fluid" can refer to a gaseous phase, a liquid phase, or a mixture of the gaseous and liquid phases. The term "fluid" preferably refers to the gaseous phase, i.e., fuel vapor.

The valve assembly 80 is movable along the axis A with respect to the housing between an open configuration and a closed configuration. In an alternate embodiment of the invention (not shown), the valve assembly 80 is movable along a third axis (not shown), which is parallel to the axis A and the second axis (not shown). As shown in FIG. 1, the open configuration permits substantially unrestricted fluid flow between the inlet and outlet ports 20,22. The closed configuration in FIG. 2, substantially isolates fluid flow between the inlet and outlet ports 20,22. The valve assembly 80 is also movable to an intermediate configuration, FIG. 3, which provides restricted fluid flow, i.e., reduced from unrestricted flow, between the inlet and outlet ports 20,22. The valve assembly 80 includes a distal valve element 30 and a proximate valve element 40, which are movable along an axis A with respect to the housing. As used herein, the terms "distal" and "proximate" refer to positions within the valve 10 with respect to the actuator 70.

The distal valve element 30 includes at least one orifice 36 and a homogenous seal member including a distal seal portion 32 and a proximate seal portion 34. Alternatively, the seal member can include separate seal elements or a single seal element disposed at an interface between the housing and the valve assembly 80. When the single seal element contacts or is in close proximity to the interface, the single seal element can deform in response to a differential between an inlet pressure level at the inlet port 20 and an outlet pressure level at the outlet port 22 such that there is restricted fluid flow between the inlet and outlet ports 20,22. Preferably, the seal member is a homogenous whole with the distal seal portion 32 and the proximate seal portion 34. The at least one orifice 36 provides a flow path between the inlet and outlet ports 20,22 in the open and intermediate configurations. The seal member 32,34 includes a distal annular extension 33 projecting obliquely toward the axis A in the open configuration and a proximate annular extension 35 projecting obliquely toward the axis A in the open configuration. The distal and proximate annular extensions 33,35 may be hollow frustums. The seal member 32 engages an internal surface of the housing in the closed and intermediate configurations. The seal member 34 engages the internal surface of the housing in the intermediate configuration. A flange 38 is fixed to shaft 75 to which armature 74 is also coupled. The distal valve element 30 is positionable with respect to the proximate valve element 40.

The proximate valve element 40 is fixed with respect to the armature 74 and is displaceable along the axis A with respect to the inlet housing portion 12 and between an open position and a closed position with respect to the distal valve element 30. In the open position, the proximate valve element 40 is spaced from the seal member 34 in the intermediate configuration. In the closed position, the proximate valve element 40 engages the seal member 32,34 in the closed configuration. The open configuration includes the open position of the distal valve element 30 and the proximate valve element 40.

A distal resilient element 50, e.g., a coil spring that can be centered around the axis A, extends between the distal valve element 30 and a locator 52 disposed on an internal wall of the inlet housing portion 12. The distal resilient element 50 biases the distal valve element 30 toward the open configuration in opposition to the actuating force of the actuator 70.

A proximate resilient element 60, e.g., a coil spring that can be centered around the axis A, extends between the distal valve element 30 and the proximate valve element 40. Thus, the distal and proximate resilient elements 50, 60 can have coincidental central axes. The proximate resilient element 60 biases the distal valve element 30 away from the proximate valve element 40. The proximate resilient element 60 biases the distal valve element 30 and the proximate valve element 40 toward the open position. A biasing force of the proximate resilient element 60 is greater than a biasing force of the distal resilient element 50.

The actuator 70 displaces the valve assembly 80 from the open configuration to the closed configuration and defines the intermediate fluid communication path 26. The actuator 70 includes a stator 72, the armature 74, a bobbin 76, and a winding 78. For example, the actuator 70 can be electromagnetic, piezoelectric, or any other type of actuator. Preferably, the actuator 70 is an electromagnetic solenoid. The armature 74 is operatively connected to the valve assembly 80 and provides a first magnetic pole. The stator 72 provides a second magnetic pole to which the first magnetic pole can be attracted. The bobbin 76 surrounds the stator 72 and provides a wire form. The bobbin 76 includes at least one channel 73, which can extend substantially parallel to the axis A, and can include at least one gutter 77, which extends substantially radially with respect to the axis A. The at least one channel 73 can be oblique to the axis A.

Preferably, the at least one channel 73 can extend substantially parallel to the axis A. The at least one channel 73 partially defines the intermediate fluid communication path 25. Fluid flow through the at least one channel 73 provides cooling for the actuator 70. The at least one channel 73 and the at least one gutter 77 are in fluid communication. The winding 78 includes a plurality of wire loops on the wire form. The stator 72 is fixed with respect to the main housing portion 12, and the armature 74 is displaceable along the axis A with respect to the stator 72. The stator 72 supports a bearing that guides a shaft 75 which connects the armature 74 and the proximate valve element 40.

There are a plurality of configurations of the distal and the proximate valve elements 30, 40 with respect to the housing. The open configuration, as shown in FIG. 1, permits substantially unrestricted fluid flow from the inlet port 20 to the outlet port 22. In the open configuration, the distal valve element 30 is spaced from the inlet housing portion 12 such that fluid communication is permitted through the inlet fluid communication path 24 through a gap between the distal valve element 30 and the inlet housing portion 12, through the at least one orifice 36 penetrating the distal valve element 30, through the intermediate fluid communication path 25, and through the outlet fluid communication path 26.

Figure 2:
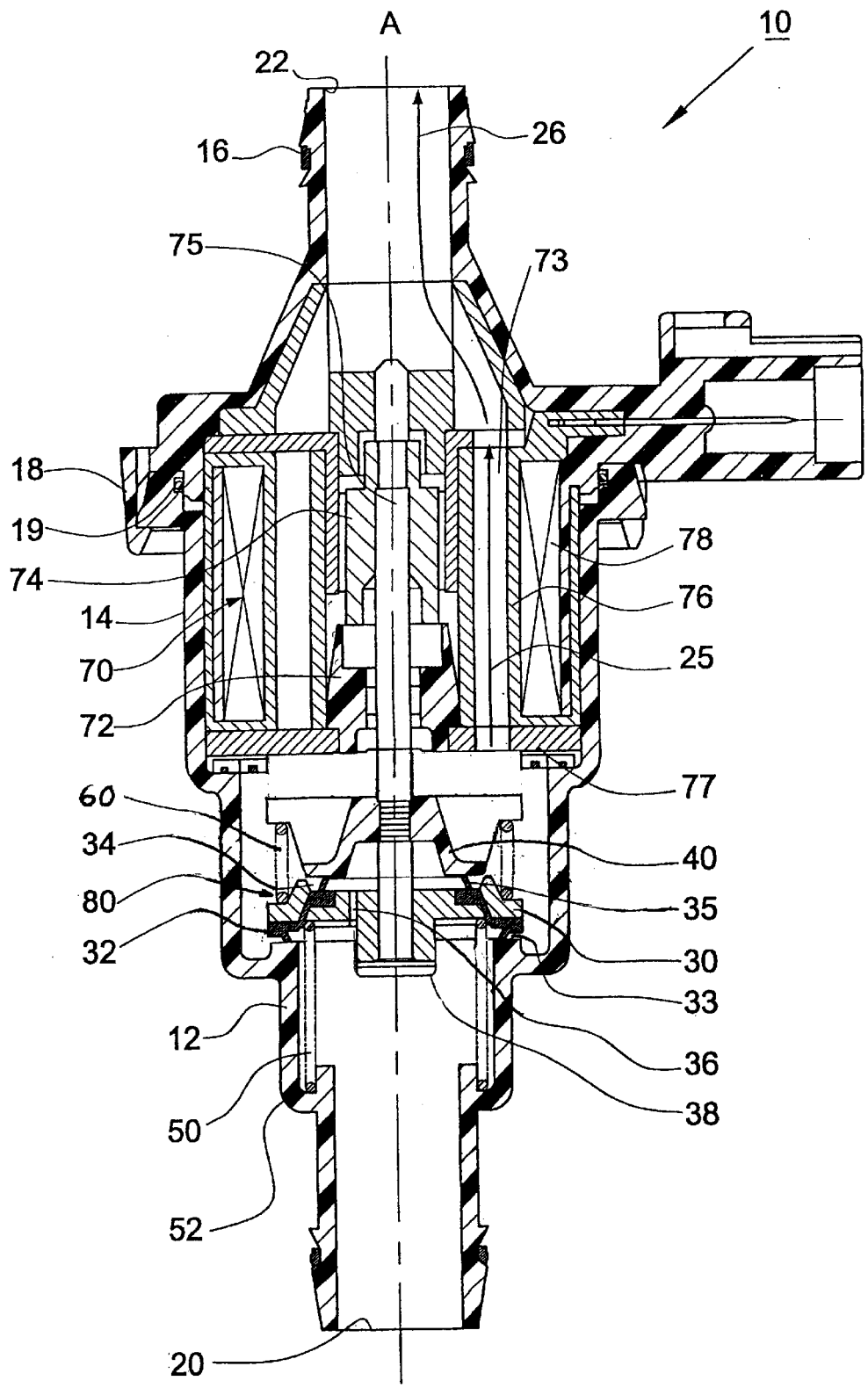
FIG. 2 is a sectional view of a fuel tank pressure control valve in a second configuration wherein fluid flow is not permitted through first, second, and third parts of a fluid communication path.

The closed configuration FIG. 2 substantially isolates fluid flow from the inlet port 20 to the outlet port 22. In FIG. 2, the distal seal 32 engages the internal surface of the inlet housing portion 12 such that the gap of the inlet fluid communication path 24 is closed. The proximate valve element 40 engages the seal member 34, thus preventing flow through the at least one orifice 36. In particular, the proximate valve element 40 is positioned with respect to the distal valve element 30 such that the fluid communication paths 24,25,26 are closed. To achieve this position, the proximate valve element 40 is displaced by the actuator 70 along the axis A toward the distal valve element 30.

In FIG. 2, if fuel tank pressure becomes too large, e.g., through burst pressure, agitation, hot ambient conditions, etc., the distal and proximate valve elements 30,40 permit flow of fuel vapor from the inlet port 20 to the outlet port 22. The release of pressure provides a blow-off feature. This is achieved because the pressure acting on the distal and proximate valve elements 30,40 is greater than the force of the actuator 70, the proximate resilient element 60, and the distal resilient element 50. When this occurs, the distal valve element 30 is spaced from the inlet housing portion 12 and the proximate valve element 40 is spaced from the distal valve element 30. Thus, fluid communication is permitted through the gap and the at least one orifice 36.

Figure 3:
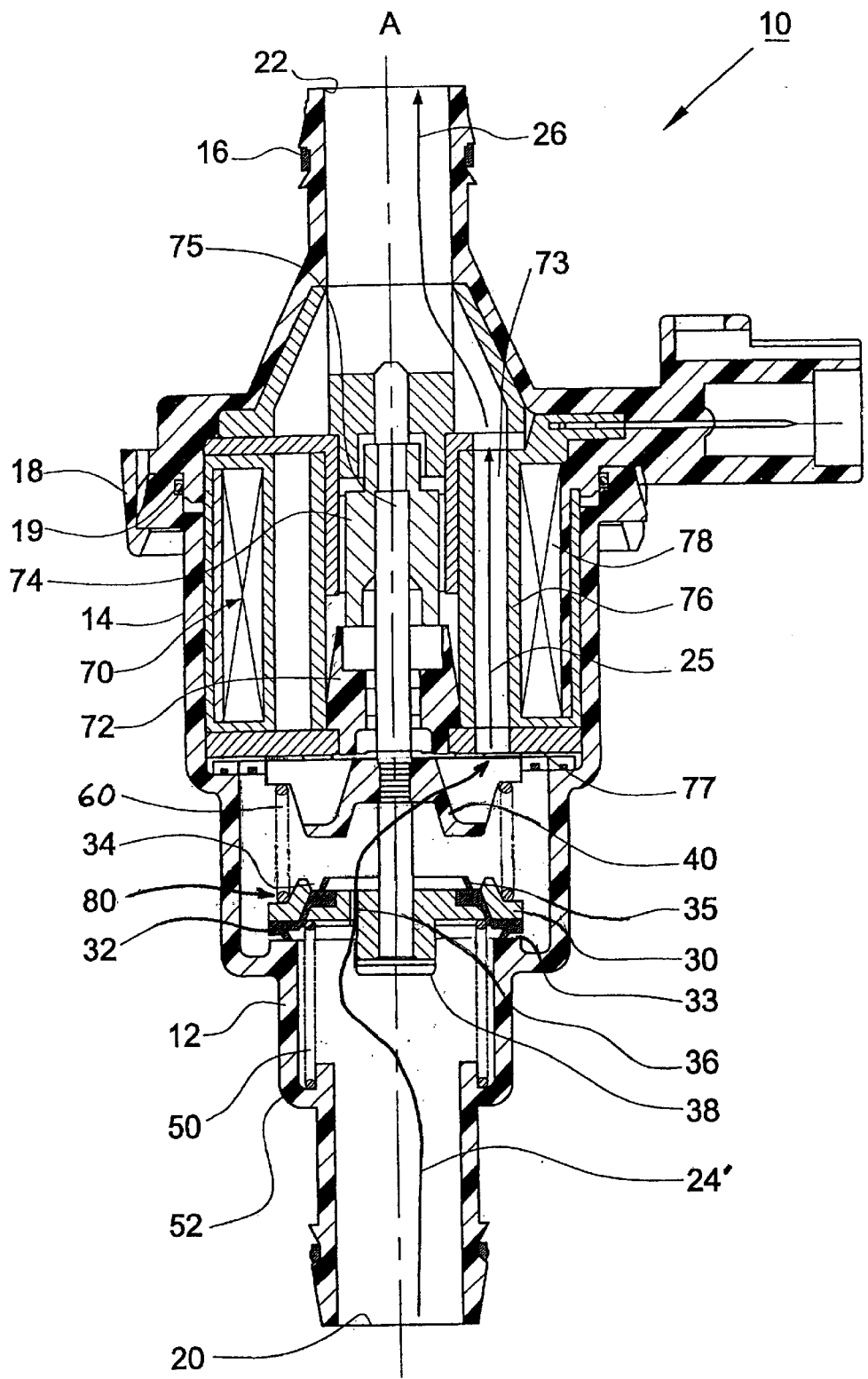
FIG. 3 is a sectional view of a fuel tank pressure control valve in a intermediate configuration wherein fluid flow is restricted through first, second, and third parts of a fluid communication path.

The intermediate configuration. FIG. 3, provides restricted fluid flow from the inlet port 20 to the outlet port 22. In the intermediate configuration, the distal seal 32 engages the inlet housing portion 12 such that the gap is closed, and the proximate valve element 40 is positioned away from the proximate seal 34 such that fluid communication is permitted through the outlet fluid communication path 26, i.e., through the at least one orifice 36. The intermediate configuration occurs at an intermediate position between the open and closed configurations.

The actuator 70, e.g., an electromagnetic solenoid, operates through a power device, which can be a constant current driver or a pulse-width-modulated signal, such that there is an approximately fifty percent power level when the valve 10 is in the intermediate configuration. Thus, when the actuator 70 is not energized, the inlet, intermediate, and outlet fluid communication paths 24,25,26 allow fluid flow therethrough. This also provides a fail-safe condition such that fuel vapor build-up is prevented in the fuel tank. At an approximately one hundred percent power level, the valve 10 is in the closed configuration.

This fuel tank pressure control valve 10 provides low flow restriction during fuel tank re-fueling (i.e., in the open configuration), fails to an open state (i.e., the open configuration), and provides restricted flow during routine vehicle operation to ensure that a sufficient vapor pressure is maintained to suppress additional fuel vapor generation (i.e., the intermediate configuration). During carbon canister purging (i.e., the closed configuration) excess hydrocarbons stored in the canister are purged to an internal combustion engine. Thus, fuel tank pressure control valve 10 isolates the fuel tank, thereby preventing purging directly from the evaporative emission space of the fuel tank. Isolating the fuel tank, therefore, prevents or reduces the amount of hydrocarbons in tail-pipe emissions.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A valve structure comprising:

a housing including a first portion, a second portion, and an intermediate portion, the first portion extending along a first axis from a first port, the second portion extending along a second axis from a second port, and the intermediate portion connecting the first and second portions, the first and second portions partially defining a fluid communication path between the first and second ports; and a valve movable with respect to the housing between first and second configurations, the first configuration permitting substantially unrestricted fluid flow between the first and second ports, and the second configuration substantially preventing fluid flow between the first and second ports; and an actuator displacing the valve from the first configuration to the second configuration, the actuator including dynamic and static portions with respect to the housing, the dynamic portion being coupled to the valve and being separated from the fluid communication path, and the static portion partially defining the fluid communication path between the first and second ports.

2. The valve structure according to claim 1, wherein the first axis extends parallel to the second axis.

3. The valve structure according to claim 2, wherein the first axis is collinear with the second axis.

4. The valve structure according to claim 1, wherein the fluid communication path comprises a first part, a second part, and an intermediate part connecting the first and second parts, the first portion of the housing defines the first part of the fluid communication path, the second portion of the housing defines the second part of the fluid communication path, and the actuator defines the intermediate part of the fluid communication path.

5. The valve structure according to claim 4, wherein the fluid communication path consists of the first, second, and intermediate parts.

6. The valve structure according to claim 1, further comprising:

a first resilient element biasing the valve toward the first configuration.

7. The valve structure according to claim 6, wherein the valve is movable to an intermediate configuration providing restricted fluid flow between the first and second ports.

8. A valve structure comprising:
- a housing including a first portion, a second portion, and an intermediate portion, the first portion extending along a first axis from a first port, the second portion extending along a second axis from a second port, and the intermediate portion connecting the first and second portions, the first and second portions partially defining a fluid communication path between the first and second ports; and
- a valve movable with respect to the housing between first and second configurations, the first configuration permitting substantially unrestricted fluid flow between the first and second ports, and the second configuration substantially preventing fluid flow between the first and second ports, the valve is also movable to an intermediate configuration providing restricted fluid flow between the first and second ports, the valve including:
  - a first valve element including at least one orifice, a first seal, and a second seal, the at least one orifice providing the restricted fluid flow between the first and second ports, and the first seal engaging the housing in the second and intermediate configurations; and
  - a second valve element positionable between first and second arrangements with respect to the first valve element, the first arrangement of the second valve element being spaced from the second seal in the intermediate configuration, and the second arrangement of the second valve element engaging the second seal in the second configuration;
- a first resilient element biasing the valve toward the first configuration; and
- an actuator displacing the valve from the first configuration to the second configuration the actuator partially defining the fluid communication path between the first and second ports.

9. The valve structure according to claim 8, further comprising:
- a second resilient element biasing the first and second valve members toward the first arrangement.

10. The valve structure according to claim 9, wherein the second resilient element comprises a greater biasing force than the first resilient element.

11. The valve structure according to claim 10, wherein the first and second resilient elements comprise coil springs having coincidental central axes.

12. The valve structure according to claim 8, wherein the first configuration comprises the first arrangement of the first and second valve elements.

13. The valve structure according to claim 8, wherein the valve is movable along a third axis, and at least one of the first and second seals comprises an annular lip projecting obliquely toward the third axis in the first configuration.

14. The valve structure according to claim 13, wherein in the third axis extends parallel to the first and second axes.

15. The valve structure according to claim 14, wherein the third axis is collinear with the first and second axes.

16. The valve structure according to claim 13, wherein the annular lip comprises a hollow frustum.

17. The valve structure according to claim 1, further comprising:
- a seal located at an interface between the housing and the valve, the seal deforming in response to a differential between a first pressure level at the first port and a second pressure level at the second port such that there is restricted fluid flow between the first and second ports.

18. The valve structure according to claim 1, wherein the actuator comprises an electromagnetic solenoid.

19. The valve structure according to claim 18, wherein the dynamic portion comprises an armature, and the static portion comprises a stator, a bobbin, and a winding, the armature is operatively connected to the valve and provides a first magnetic pole, the stator provides a second magnetic pole to which the first magnetic pole is attracted, the bobbin surrounds the stator and provides a wire form, and the winding includes a plurality of wire loops on the wire form.

20. The valve structure according to claim 19, wherein the bobbin comprises at least one channel partially defining the fluid communication path between the first and second ports.

21. The valve structure according to claim 20, wherein the fluid flow through the at least one channel provides cooling for the electromagnetic solenoid.

22. The valve structure according to claim 20, wherein the bobbin comprises at least one gutter in fluid communication with the at least one channel, the at least one channel extending substantially along a third axis parallel to the first and second axes, and the at least one gutter extending generally radially with respect to the third axis.

* * * * *